United States Patent [19]
Gulick

[11] Patent Number: 6,012,111
[45] Date of Patent: Jan. 4, 2000

[54] PC CHIPSET WITH INTEGRATED CLOCK SYNTHESIZER

[75] Inventor: Dale E. Gulick, Austin, Tex.

[73] Assignee: Advanced Micro Devices, Inc., Sunnyvale, Calif.

[21] Appl. No.: 08/866,644

[22] Filed: May 30, 1997

Related U.S. Application Data

[63] Continuation-in-part of application No. 08/802,321, Feb. 18, 1997.

[51] Int. Cl.[7] .................................................. G06F 13/14
[52] U.S. Cl. .............................. 710/62; 326/68; 326/81; 710/107
[58] Field of Search .......................... 307/475; 326/68, 326/81; 395/287, 882; 710/107, 62

[56] References Cited

U.S. PATENT DOCUMENTS

| | | | |
|---|---|---|---|
| 4,519,034 | 5/1985 | Smith et al. | 364/200 |
| 4,683,530 | 7/1987 | Quatse | 364/200 |
| 4,885,482 | 12/1989 | Sharp et al. | 307/465 |
| 5,084,637 | 1/1992 | Gregor | 307/475 |
| 5,264,380 | 11/1993 | Pfiester | 437/37 |
| 5,300,835 | 4/1994 | Assar et al. | 307/475 |
| 5,390,191 | 2/1995 | Shiono et al. | 371/22.3 |
| 5,396,128 | 3/1995 | Dunning et al. | 326/68 |
| 5,406,140 | 4/1995 | Wert et al. | 326/68 |
| 5,410,542 | 4/1995 | Gerbehy et al. | 370/85.1 |
| 5,455,740 | 10/1995 | Burns | 361/734 |
| 5,469,082 | 11/1995 | Bullinger et al. | 326/81 |
| 5,557,757 | 9/1996 | Gephardt et al. | 395/306 |
| 5,696,912 | 12/1997 | Bicevskis et al. | 395/308 |
| 5,727,171 | 3/1998 | Lachetta, Jr. | 395/287 |
| 5,734,840 | 3/1998 | Chew et al. | 395/282 |
| 5,740,387 | 4/1998 | Lambrecht et al. | 395/309 |

OTHER PUBLICATIONS

Cypress Semiconductor Corporation, "Clock Terminology", Oct. 1994.

Cypress Semiconductor Corporation, "CY2254A Clock Synthesizer/Driver", Revised Feb. 1996.

Cypress Semiconductor Corporation, "Multi–Clock Synthesizer for 3.3–V Pentium–Based PCs", 1995.

National Semiconductor, "CGS701AV Commercial Low Skew PLL 1 to 8 CMOS Clock Driver CGS701ATV Industrial Low Skew PLL 1 to 8 CMOS Clock Driver", Feb. 1997.

Fernald, Kenneth W. et al., "A System Architecture for Intelligent Implantable Biotelemetry Instruments", IEEE Engineering in Medicine & Biology Society 11th Annual International Conference, vol. 11, 1989, pp. 1411–1412.

Intel, "82371FB (PIIX) and 82371SB (PIIX3) PCI ISA IDE Xcelerator", May 1996, pp. 1–118.

Common Architecture, "Desktop PC/AT systems", Mar. 21, 1996, Version .93 Preliminary, pp. 1–26.

Advanced Micro Devices, "AM7968/Am7969 TAXIchip™ Article Reprints", Jan. 22, 1987, pp. 1–77, particularly pp. 67–72.

National Semiconductor, "PC87306 SuperI/O™ Enhanced Sidewinder Lite Floppy Disk Controller, Keyboard Controller, Real–Time Clock, Dual UARTs, Infrared Interface, IEEE 1284 Parallel Port, and IDE Interface", Preliminary— Nov. 1995, pp. 1–110.

*Primary Examiner*—Thomas C. Lee
*Assistant Examiner*—Abdelmoniem L Elamin
*Attorney, Agent, or Firm*—Zagorin, O'Brien & Graham, LLP

[57] ABSTRACT

An apparatus for processing information includes first integrated circuit, a second integrated circuit and a bus coupling the first and second integrated circuits. The first integrated circuit includes functional logic. The second integrated circuit includes a clock synthesizer circuit. The clock synthesizer circuit provides clocks for the apparatus. The second integrated circuit includes I/O terminals for the clock synthesizer circuit and for the functional logic. The bus provides for serial transfer of information between the first and second integrated circuits. The information includes output signals from the functional logic provided to the I/O terminals and input signals for the functional logic from the I/O terminals.

28 Claims, 12 Drawing Sheets

| Bit# | TRANSMIT TO PEC Function |
|---|---|
| 0 | Command Valid |
| 1 | Link command bit 0 |
| 2 | bit 1 |
| 3 | bit 2 |
| 4 | bit 3 |
| 5 | bit 4 |
| 6 | bit 5 |
| 7 | bit 6 |
| 8 | Link command bit 7 |
| 9 | Reserved |
| 10 | Reserved |
| 11 | Reserved |
| 12 | Reserved |
| 13 | Reserved |
| 14 | Reserved |
| 15 | Reserved |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |
| 32 | Floppy WGATE/ |
| 33 | Floppy HDSEL/ |
| 34 | Floppy DIR/ |
| 35 | Floppy STEP/ |
| 36 | Floppy MTR0/ |
| 37 | Floppy MTR1/ |
| 38 | Floppy DR0/ |
| 39 | Floppy DR1/ |
| 40 | Floppy DENSEL |
| 41 | Floppy DRATE0 |
| 42 | Floppy DRATE1 |
| 43 | Reserved |
| 44 | Reserved |
| 45 | Reserved |
| 46 | Reserved |
| 47 | Reserved |

| Bit# | TRANSMIT TO PEC Function |
|---|---|
| 48 | Serial port 0 RTS/ |
| 49 | Serial port 0 DTR/ |
| 50 | Serial port TD |
| 51 | Reserved |
| 52 | Reserved |
| 53 | Serial port 1 RTS/ (or kybd tx) |
| 54 | Serial port 1 DTR/(or IrDA or mouse) |
| 55 | Serial port 1 TD (or IrDA or mouse) |
| 56 | Reserved (or IrDA or mouse) |
| 57 | Reserved (or IrDA or mouse) |
| 58 | Reserved |
| 59 | Reserved |
| 60 | Reserved |
| 61 | Reserved |
| 62 | Reserved |
| 63 | Reserved |
| 64 | Reserved |
| 65 | Game X0 request |
| 66 | Game X1 request |
| 67 | Game Y0 request |
| 68 | Game Y1 request |
| 69 | Reserved |
| 70 | Reserved |
| 71 | Reserved |
| 72 | Reserved |
| 73 | Reserved |
| 74 | Reserved |
| 75 | Reserved |
| 76 | Reserved |
| 77 | Reserved |
| 78 | Reserved |
| 79 | Reserved |
| 80 | Reserved |
| 81 | Reserved |
| 82 | PC speaker out |
| 83 | MIDI TX |
| 84 | User interface out |
| 85 | User interface out |
| 86 | User interface out |
| 87 | User interface out |
| 88 | User interface out |
| 89 | User interface out |
| 90 | User interface out |
| 91 | User interface out |
| 92 | User interface out |
| 93 | User interface out |
| 94 | User interface out |
| 95 | User interface out |

FIG. 8A

| | TRANSMIT FROM PEC |
|---|---|
| Bit# | Function |
| 0 | Response/status |
| 1 | Link status bit 0 |
| 2 | bit 1 |
| 3 | bit 2 |
| 4 | bit 3 |
| 5 | bit 4 |
| 6 | bit 5 |
| 7 | bit 6 |
| 8 | Link status bit 7 |
| 9 | Reserved |
| 10 | Reserved |
| 11 | Reserved |
| 12 | Reserved |
| 13 | Reserved |
| 14 | Reserved |
| 15 | Reserved |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |
| 32 | Floppy TRK0/ |
| 33 | Floppy INDEX/ |
| 34 | Floppy DSKCHG/ |
| 35 | Floppy WP/ |
| 36 | Reserved |
| 37 | Reserved |
| 38 | Reserved |
| 39 | Reserved |
| 40 | Reserved |
| 41 | Reserved |
| 42 | Reserved |
| 43 | Reserved |
| 44 | Reserved |
| 45 | Reserved |
| 46 | Reserved |
| 47 | Reserved |

| | TRANSMIT FROM PEC |
|---|---|
| Bit# | Function |
| 48 | Serial port 0 CTS/ |
| 49 | Serial port 0 DSR/ |
| 50 | Serial port 0 DCD/ |
| 51 | Serial port 0 RI |
| 52 | Serial port 0 RD |
| 53 | Serial port 1 CTS/(or kybd rx) |
| 54 | Serial port 1 DSR/(or IrDA or mouse) |
| 55 | Serial port 1 DCD/(or IrDA or mouse) |
| 56 | Serial port 1 RI (or IrDA or mouse) |
| 57 | Serial port 1 RD (or IrDA or mouse) |
| 58 | Reserved |
| 59 | Reserved |
| 60 | Reserved |
| 61 | Reserved |
| 62 | Reserved |
| 63 | Reserved |
| 64 | Reserved |
| 65 | Game X0 done |
| 66 | Game X1 done |
| 67 | Game Y0 done |
| 68 | Game Y1 done |
| 69 | Button 0 |
| 70 | Button 1 |
| 71 | Button 2 |
| 72 | Button 3 |
| 73 | Reserved |
| 74 | Reserved |
| 75 | Reserved |
| 76 | Reserved |
| 77 | Reserved |
| 78 | Reserved |
| 79 | Reserved |
| 80 | Reserved |
| 81 | Reserved |
| 82 | Reserved |
| 83 | MIDI RX |
| 84 | Vol + |
| 85 | Vol − |
| 86 | Mute |
| 87 | Keylock |
| 88 | Turbo |
| 89 | Setup disable |
| 90 | CLR CMOS |
| 91 | Sw 0 |
| 92 | SW1 |
| 93 | SW2 |
| 94 | SW3 |
| 95 | User interface in |

FIG. 8B

PC CHIPSET WITH INTEGRATED CLOCK SYNTHESIZER

CROSS-REFERENCE TO RELATED APPLICATIONS

This application is a continuation-in-part of co-pending application Ser. No. 08/802,321, filed on Feb. 18, 1997, and, entitled "System for Partitioning PC Chipset Functions into Logic and Port Integrated Circuits", by Dale E. Gulick, and which is incorporated herein by reference, still pending.

This application relates to co-pending application, Ser. No. 08/802,323, filed on Feb. 18, 1997, and, entitled "PC Chipset Interconnection Bus", by Dale E. Gulick, and which is incorporated herein by reference, still pending.

BACKGROUND

1. Field of Use

The present invention relates to computer systems, and, more particularly, to integrating a clock synthesis function with legacy device ports.

2. Description of the Related Art

Computer systems may be found in many forms including, for example, mainframes, minicomputers, workstations, servers, personal computers, internet terminals, notebooks and embedded systems. Personal computer (PC) systems, such as the International Business Machines (IBM) compatible PC systems, include desk top, floor standing, or portable versions. A typical PC system is a microcomputer that includes a microprocessor, associated memory and control logic and a number of peripheral devices that provide input and output for the system. Such peripheral devices typically include a display monitor, a keyboard and mouse-type device, a floppy disk drive, a hard disk drive and a printer. The number of devices being added to personal computer systems continues to grow. For example, many computer systems also include televisions, modems, sound devices, voice input devices and CD-ROM, CD-R, DVD or other drives.

Historically, interfaces to peripherals utilized a large number of discrete components. However, the level of integration has continued to increase in PC systems. As a result, much of the functional logic which is required to interface with peripheral devices has been integrated into a relatively few integrated circuits (ICs) which are sold as chipsets for the PC. Each IC includes terminals, pins, or leads, connecting the IC to the printed circuit board (PCB) to which the IC is mounted. The PCB functions as a system board. The terminals communicate input/output (I/O) signals between one IC and other ICs or I/O devices coupled to the system board. ("I/O" commonly refers to input, output and/or input/output and typically describes signals, terminals, circuits, buses and/or devices.) These system boards often receive expansion PCBs to increase the capabilities of the computer system and to connect to peripheral devices through an expansion bus.

PC systems use one of several expansion bus architectures to facilitate communication between various components of the system and to provide the versatility needed to add additional components to the system. For example, the Industry Standard Architecture (ISA) provides an expansion bus for the 16-bit IBM AT personal computer. The Enhanced ISA (EISA) provides specifications for systems utilizing 32-bit microprocessors such as the Intel 80386 and 80486 microprocessors. The Peripheral Component Interconnect (PCI) bus provides a bus architecture for 32-bit or 64-bit interconnection systems independent of processor generation or family.

The ISA bus, originally called the Advanced Technology (AT) bus, added the functionality needed for full 16-bit technology, but maintained compatibility with an older 8-bit PC bus. Because of its initial speed and data-path match with the 80286 microprocessor, the original ISA bus substantially out-performed the PC bus. The ISA bus has resisted replacement by newer bus architectures such as EISA and Microchannel, and remains commonplace in personal computer systems in use today. This is true in part because many devices that are designed to interface with the ISA bus are in widespread use today. Such devices typically do not require the higher speed provided by the newer buses. Such devices are known as legacy devices since their design is based on older PC technology. Examples of such slower legacy devices include keyboards and mice, game port devices such as joysticks, floppy drives, modems connected to serial communication ports, printers connected to parallel communication ports, direct memory access (DMA) controllers, interrupt controllers and timers. Those legacy devices do not need the high speed throughput of the newer generation of buses such as EISA, Microchannel Architecture (MCA) and the Peripheral Component Interconnect (PCI) bus.

Although personal computer system speeds have increased dramatically, the speed of the ISA bus is limited to 8 MHz. As higher speed processors were utilized, dedicated memory buses were added to personal computer systems because the ISA bus was too slow for the required high speed memory accesses. Video applications also became limited by the bandwidth of the ISA, so systems began to use a "local bus" for video applications. Although initially targeted at advanced video systems, new local bus specifications were made broad enough for handling other peripherals requiring high-bandwidth transfers such as mass storage devices and network interfaces.

The Peripheral Component Interconnect (PCI) bus is one example of a local bus specification. The VL bus is another local bus specification that has been less widely adopted. The PCI bus provides a high-speed interconnection system which runs more closely to microprocessor speeds than does a traditional expansion bus. And, although initially designed for 32-bit microprocessors, the PCI specification is broad enough to include the 64-bit data paths of advanced processors. Legacy devices compatible with older bus architectures such as the ISA connect to the PCI bus via a bus bridge circuit.

Many present day personal computer systems contain both a PCI bus and an ISA bus. The PCI bus is used to connect to newer peripherals and/or those peripherals requiring a higher speed interface. The ISA bus is typically connected to legacy devices. Referring to FIG. 1, an exemplary prior art computer system 100 is shown that includes both a PCI bus and an ISA bus. Computer system 100 includes processor 110 which is coupled to secondary cache 115 and memory 140. Bridge 120 provides an interface between the processor/memory system 105 and PCI bus 125. Bridge 120 provides a communication link between PCI devices 150, 160 and 165 and the processor/memory system 105. In fact, although the PCI bus was originally intended for graphics, high speed graphics requirements have resulted in another specialized graphics bus called the Advanced Graphics Port Bus which can be utilized in place of the PCI bus for graphics applications. The PCI devices may be integrated circuits on the system board of computer system 100, expansion components connected to PCI bus 125 via expansion slots, or some combination thereof. A second bridge 130, provides a bus interface between the PCI bus 125 the ISA expansion bus 135.

In order to communicate with legacy devices which are designed to interface to the ISA bus, one approach, consistent with the trend towards increased integration in the PC, has been to provide a super I/O chip 170 rather than provide a number of discrete interfaces. Super I/O chip 170 provides I/O terminals and control logic for commonly used legacy peripheral devices such as keyboards, IDE drives, IEEE parallel ports, serial communication ports. One example of such a super I/O chip is the National Semiconductor PC87306 SuperI/O chip ("SuperI/O" is a trademark of National Semiconductor Corporation of Santa Clara, Calif.). Thus, legacy devices can be included in the system by utilizing bridge 130, the ISA bus, and super I/O chip 170.

SUMMARY

It has been discovered to combine a bridge function such as a PCI bridge with a super I/O function. Further, it has been discovered to provide a first integrated circuit that includes super I/O functional logic to logically interface to legacy devices and a second integrated circuit that provides the input/output terminals for the super I/O functional logic to physically interface to legacy devices. Additionally, it has been discovered to integrate a clock synthesizer with legacy device ports on the second integrated circuit.

Such a system advantageously provides the clock synthesizer function on an integrated circuit developed by a semiconductor process that is well suited for a quasi-analog clock synthesis function. Also, greater control over power management is offered by putting the clock synthesis function in a chipset. Furthermore, the separation of functional logic and the I/O terminals into separate integrated circuits alleviates the pressure on pin count and package cost of the functional logic IC.

The invention also provides the advantage of avoiding problems associated with reduced supply voltages. As process geometries shrink, supply voltages drop, e.g., to 3.3 volts or less, leading to problems interconnecting to the various super I/O interface pins. The super I/O typically drives legacy devices having 5 volt I/O logic. The smaller geometries utilized for today's faster and denser integrated circuits can have problems interconnecting at that voltage. The invention provides for building the first integrated circuit with the smaller process geometries to provide a faster and denser chip. However, the second integrated circuit can be built with slower technologies, e.g., where the transistors have channel lengths of 0.5 microns or above. Thus, the problem of connecting 5 volts legacy interfaces to integrated circuits made with smaller process geometries is also reduced.

In one embodiment, an apparatus for processing information includes a first integrated circuit, a second integrated circuit and a bus coupling the first and second integrated circuits. The first integrated circuit includes functional logic. The second integrated circuit includes a clock synthesizer circuit. The clock synthesizer circuit provides clocks for the apparatus. The second integrated circuit includes I/O terminals for the clock synthesizer circuit and for the functional logic. The bus provides for serial transfer of information between the first and second integrated circuits. The information includes output signals from the functional logic provided to the I/O terminals and input signals for the functional logic from the I/O terminals.

In another embodiment, a method of providing an integrated clock synthesizer includes providing functional logic on a first integrated circuit and providing a clock synthesizer circuit on a second integrated circuit. The method further includes providing I/O terminals on the second integrated circuit for the clock synthesizer circuit and the functional logic and providing a bus between the first and second integrated circuits. The bus serially transfers information between the first and second integrated circuits. The information includes output signals from the first integrated circuit provided to the I/O terminals and input signals for the functional logic from the I/O terminals.

In still another embodiment, an integrated circuit includes a clock synthesizer circuit and at least one legacy device port. The at least one legacy device port includes at least one of a serial port, a keyboard, a mouse, a game port, a musical instrument digital interface (MIDI) port, a floppy drive and a PC speaker. The first integrated circuit further includes clock I/O terminals for the clock synthesizer circuit and port I/O terminals. The clock I/O terminals providing clock outputs and control inputs. The port I/O terminals are for interfacing to at least one legacy device corresponding to the legacy device port.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

FIG. 8*a* shows the frame transmitted from the South Bridge to the port expansion circuit on Data Out.

FIG. 8*b* shows the frame transmitted from the port expansion circuit to the South Bridge on Data In.

DESCRIPTION OF THE PREFERRED EMBODIMENT(S)

Figure 1:
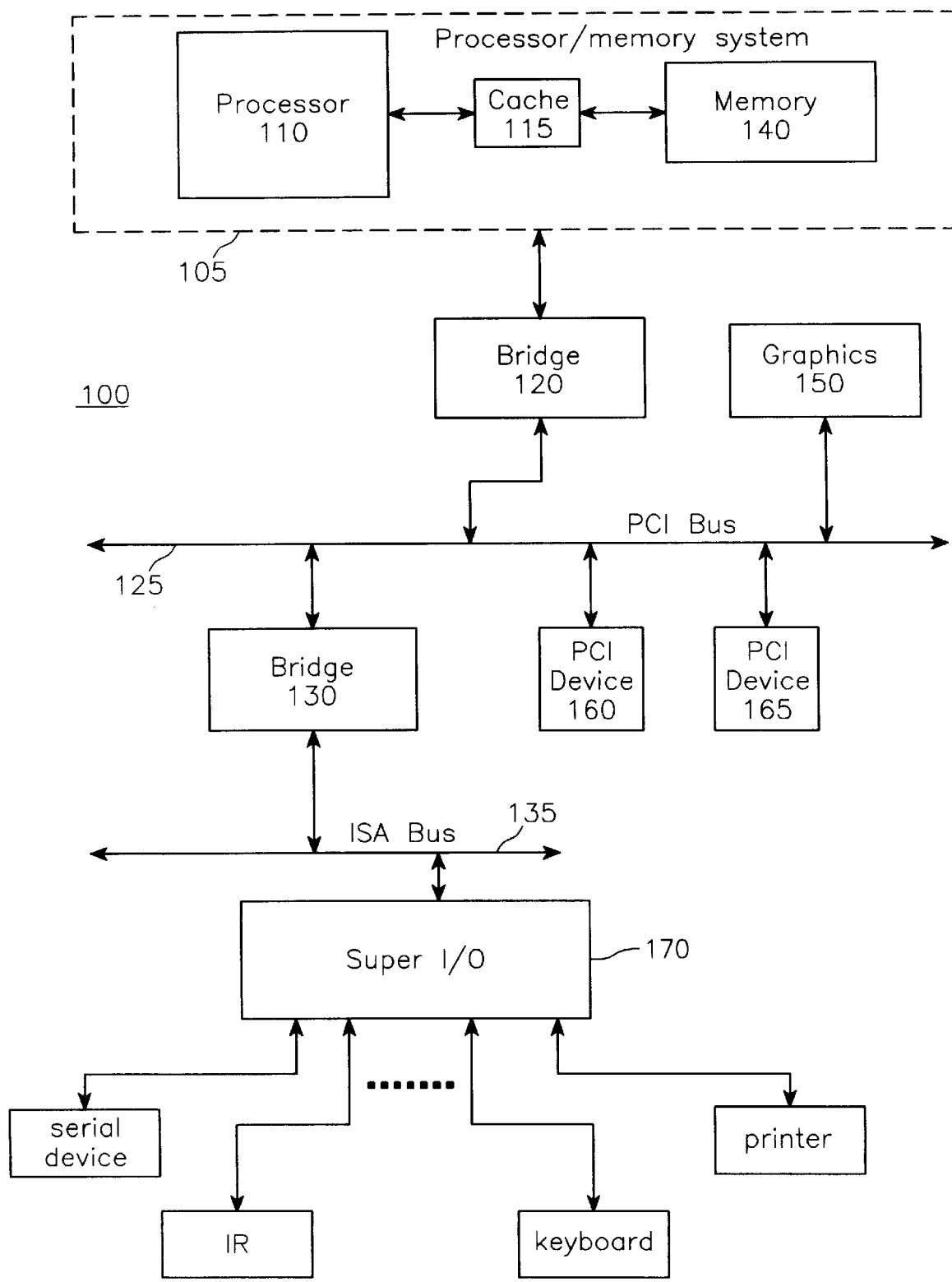
FIG. 1 shows a schematic block diagram of a prior art personal computer.
Figure 2:
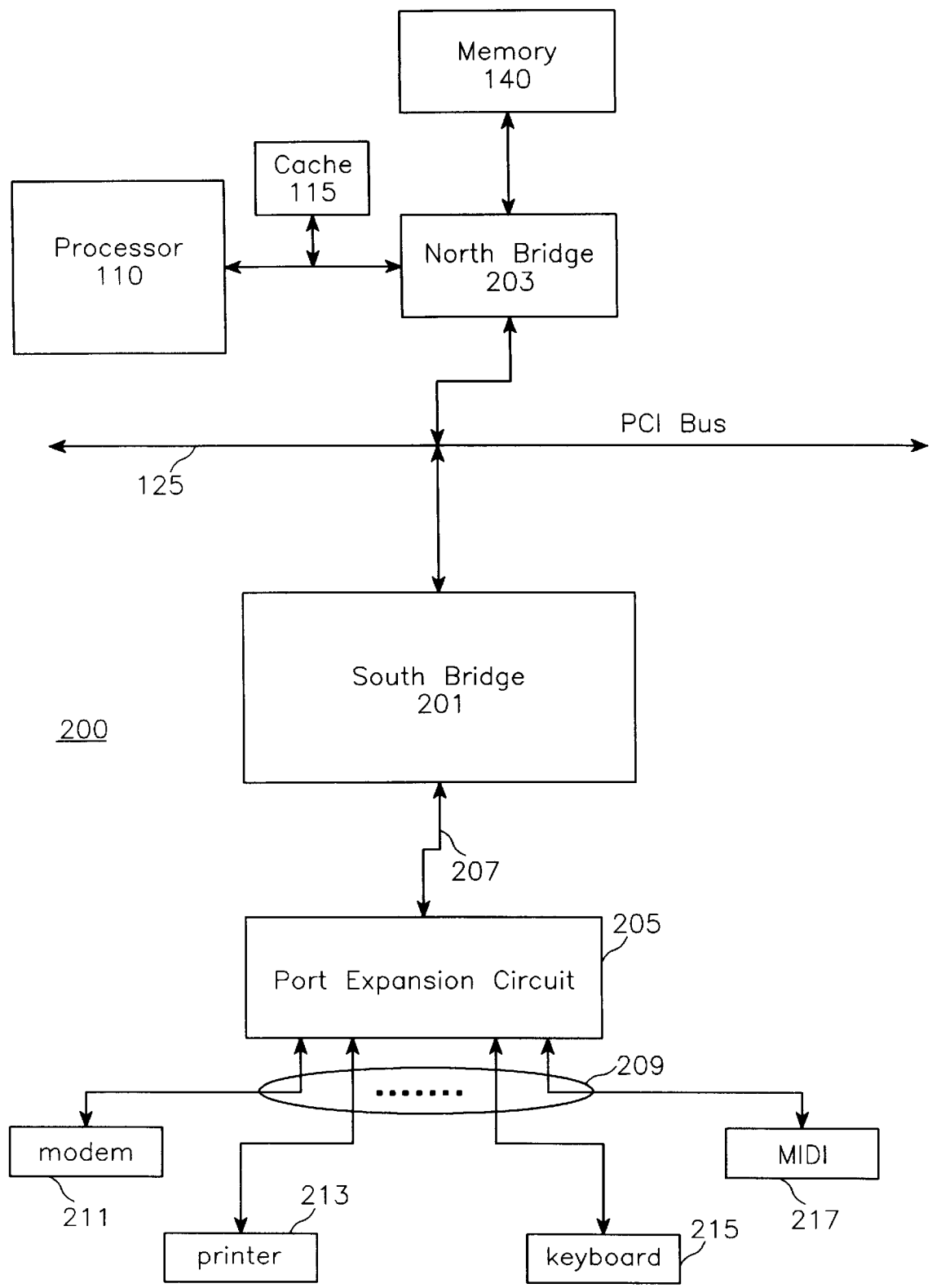
FIG. 2 shows a block diagram of a PC which includes a South Bridge circuit and port expansion circuit in accordance with the present invention.

FIG. 2 shows a computer system according to the present invention. Computer system 200 comprises processor 110 which is coupled to cache memory 115 and memory 140. Bridge circuit 203 (North Bridge), provides an interface between the processor and memory and the PCI bus 125. Bridge circuit 201 (South Bridge) provides an interface between PCI bus 125 and a plurality of legacy devices. The bulk of the I/O pins that would normally be required to provide I/O for the South Bridge are provided instead on a separate circuit 205, connected to the South Bridge 201 via port expansion bus 207. The separate circuit 205 will be referred to herein as the port expansion circuit (PEC). The port expansion circuit provides I/O 209 to connect to the plurality of legacy devices such as a modem 211, a printer 213, a keyboard and/or mouse 215 or an electronic instrument 217 through a Musical Instrument Digital Interface (MIDI). The port expansion bus 207 connecting port expansion circuit 205 and South Bridge 201 operates to transfer signals that should be output to the legacy devices from the South Bridge to the port expansion circuit 205. The port expansion bus 207 also operates to transfer signals that are received from the legacy devices from the port expansion circuit to the to the South Bridge. In a preferred embodiment, both the South Bridge 201 and the port expansion circuit 205 are each separate integrated circuits.

Additional legacy devices are also supported by the South Bridge in combination with the port expansion circuit and will be described further herein. The South Bridge includes the logic necessary to interface the legacy devices to the rest of computer system 200 through the ISA bus. In addition to the I/O function, the port expansion circuit may incorporate additional logic functions as described further herein.

Figure 3:
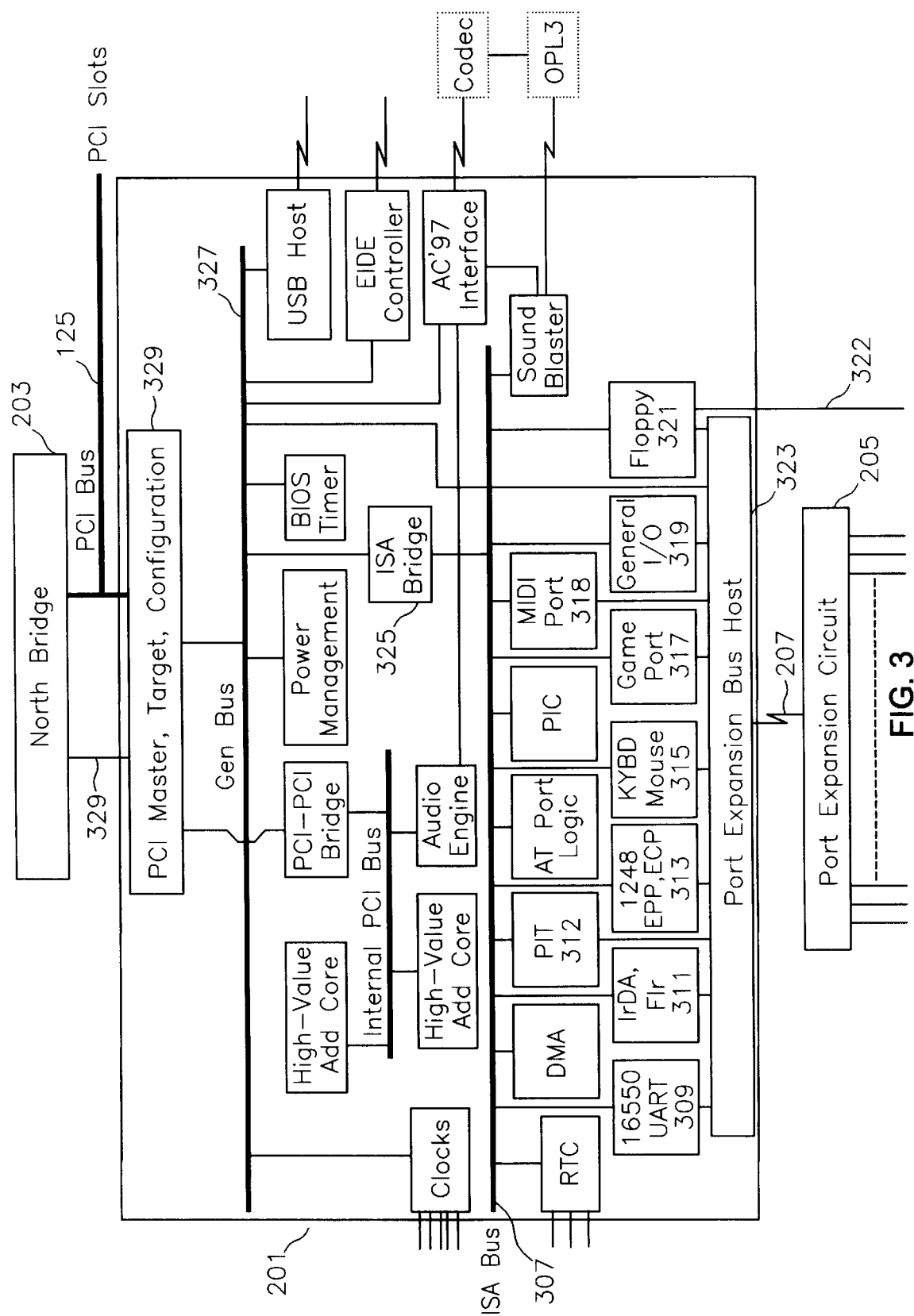
FIG. 3 shows a block diagram of the South Bridge circuit of the personal computer architecture of FIG. 2.

Referring now to FIG. 3, the South Bridge is shown in greater detail. Specifically, the South Bridge includes a number of logic blocks to support interfacing to the most commonly used legacy I/O devices. For instance, in a preferred embodiment, the South Bridge may include one or more universal asynchronous receiver transmitter(s) (UART) block 309, which for the embodiment shown is a 16550 UART, an infrared (IR) interface block 311 which may support both the Infrared Data Association (IrDA) standard and the Fast IR standard, Programmable Interval Timer (PIT) 312 which couples to a PC speaker on the port expansion circuit side, a parallel interface controller 313 for the IEEE 1248 parallel port, interface logic 315 for the keyboard and for the mouse, game port logic 317 for the game port, interface logic 318 for a MIDI port and General I/O 319 which is described further herein. A floppy controller 321 is also provided. Note that in some embodiments the floppy controller may include some input/output pins on the South Bridge and in other embodiments all the input/output pins are on the port expansion circuit. When the data separator is on the port expansion circuit, all the pins can be reflected onto the port expansion circuit and the I/O 322 coming off the South Bridge becomes unnecessary. The clock synthesizer may be placed in the port expansion circuit as described further herein.

Those logic blocks to logically interface the legacy devices are coupled to ISA bus 307 which is internal to the South Bridge. Thus, in one preferred embodiment, the ISA bus has been incorporated into the South Bridge chip and the legacy devices are devices that interface to the ISA expansion bus (input/output bus) through the interface logic in the South Bridge. ISA bus 307 is coupled through ISA Bridge 325 to Gen Bus 327 which in the embodiment shown is a simplified PCI bus. In turn, Gen Bus 327 is coupled through interface block 329 to PCI bus 125. The South Bridge also includes sideband signals 329 which are coupled to the North Bridge. Such sideband signals provide for legacy signals such as interrupts which can not be handled over the PCI bus.

Each of the functional blocks 309–321 provide the logic necessary to interface signals from the ISA bus 307 to each of the devices coupled to the port expansion circuit. For example, block 309 which is a 16550 UART can be connected to a serial communications device such as a modem. Block 313 may be connected to a printer or other device on the parallel port. The floppy control block 321 is coupled to a floppy drive and the game port can be coupled to two joysticks. The keyboard and mouse control block 315 can be coupled to a keyboard and/or a mouse. The function of the control blocks 307–321 in the South Bridge to interface to the legacy devices is well known and the detailed functioning of that logic will not be further described except hen needed for a better understanding of the claimed invention.

Providing I/O capability for all the legacy devices as well as performing the bus interface and other functions on the South Bridge would require an IC with more I/O capability and would therefore could be a more expensive part. It is preferable to build an IC which can be more inexpensively packaged in, e.g., quad flat packs and avoid more expensive packaging such as ball grid arrays which can provide higher pin density but can also be more costly to produce. In many instances, reducing pin count significantly can reduce the package cost of the product.

Separating the I/O function from the logic function provides further advantages. As discussed, as process geometries shrink for faster and denser integrated circuits, e.g. channel lengths of 0.35 microns and below, supply voltages drop, e.g., to 3.3. volts or less, leading to problems driving the various devices on the super I/O interface pins which are typically 5 volts. The super I/O interfaces tend to be 5 volts interfaces which is typical of the legacy devices. Since high speed is desired for the South Bridge IC, it is preferable to build the chip with the smaller process geometries to provide a faster and denser chip. However, the port expansion circuit chip can be built with slow technologies, e.g., where the transistors have channel lengths of 0.5 microns or above. That allows the port expansion circuit to be built with older and less expensive process technology and also allows the port expansion circuit to easily interconnect to the 5 volts interfaces typical of the legacy devices. At the same time, the more speed sensitive South Bridge can be built with the most up to date process technologies providing channel lengths for the transistors of the internal logic of, e.g., 0.35 microns, without the problem of interconnecting to a large number of 5 volts interfaces.

Therefore port expansion circuit 205 provides the I/O terminals for the functional blocks 309–321 for coupling the functional block 309–321 pins to the devices. That entails sending the output signals from the South Bridge to the port expansion circuit at a rate that is faster than the rate of change of the signals that are sent. Further, the input signals on the connectors of the port expansion circuit must be sent to the logic interfaces in the South Bridge for the particular device, such as a modem, at a rate faster than the rate of change of the signals from the particular device.

Each of the functional blocks 309–321 in the South Bridge are coupled to interface 323 also called the port expansion bus host. The port expansion bus host interface 323 is also coupled to Gen Bus 327 so that the CPU can read and write certain registers in the host interface as described further herein. Note that interface 323 may be coupled to ISA bus 307 instead of Gen Bus 327.

Bus 207, which will be referred to herein as the port expansion bus (PEB, couples interface 323 to the port expansion circuit 205. Port expansion bus 207 is utilized to transfer the states of the output signals from the functional blocks 309–321 to the output pins of the port expansion circuit, port expansion bus 207 is also used to transfer the states of the signals on the input pins of the port expansion circuit to the appropriate blocks in the South Bridge.

Figure 4:
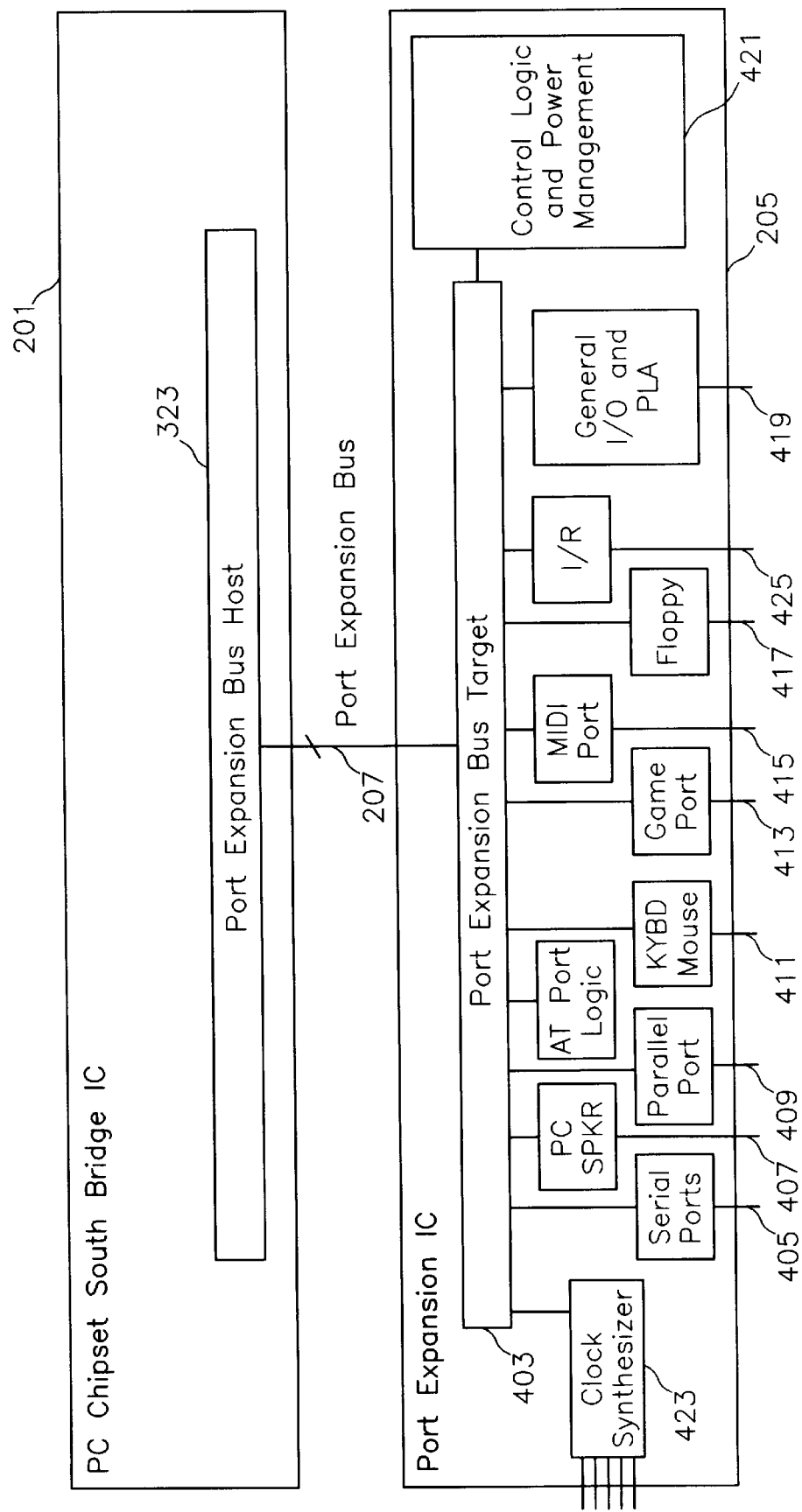
FIG. 4 shows a block diagram of a port expansion circuit (PEC) of the personal computer of FIG. 2.

The port expansion circuit 205 is shown in block diagram form in FIG. 4. The port expansion bus target interface 403 provides the interface to port expansion bus 207. Interface 403 provides signals from the South Bridge IC to the output pins for serial ports 405, PC speaker 407, parallel port 409, keyboard and mouse 411, game port logic 413, MIDI port 415, floppy 417, IR port 425 and General I/O 419. Control block 421 provides control function for interface 403. For example, control block 421 also provides a power management function which is discusses further herein. In addition, the control block decodes commands sent from the South Bridge and maintains status information which can be provided to the South Bridge as discussed further herein. Clock synthesizer 423 provides the multiple clocks which are required by the PC system. The clock synthesizer is also discussed further herein.

In order for the Port Expansion Circuit 205 to provide I/O function for the South Bridge IC, the output signals from the interface logic blocks in the South Bridge IC have to be reflected onto the output pins of the port expansion circuit. Therefore, the output signals have to be sampled in the South Bridge and provided to the output pins of the port expansion circuit at a rate faster than the output signals change. Additionally, the input signals on the input pins of the port expansion circuit have to be sampled and provided to the interface logic blocks in the South Bridge IC at a rate faster than the input signals change. In one exemplary embodiment, a protocol-free six wire bus running at about 50 MHz provides the necessary bandwidth to allow the port expansion circuit to provide I/O for the various interface logic blocks in the South Bridge. Utilizing such an approach can reduce the South Bridge pin count by approximately 70 or more pins. Such savings in pin count generally leads to a less costly chip.

The bus may come in several embodiments. In one embodiment, which is intended to provide pin reflection capability for slower devices, the bus is a basic four-pin serial bus shown in FIG. 5. Another embodiment of the bus supports higher speed ports, e.g., to provide the necessary bandwidth for the higher speed parallel port. In some circumstances, only the first embodiment may be necessary, if for instance, the parallel port is not utilized or is connected to the South Bridge rather than the port expansion circuit, or if the speed of the port expansion bus is increased significantly.

Figure 5:
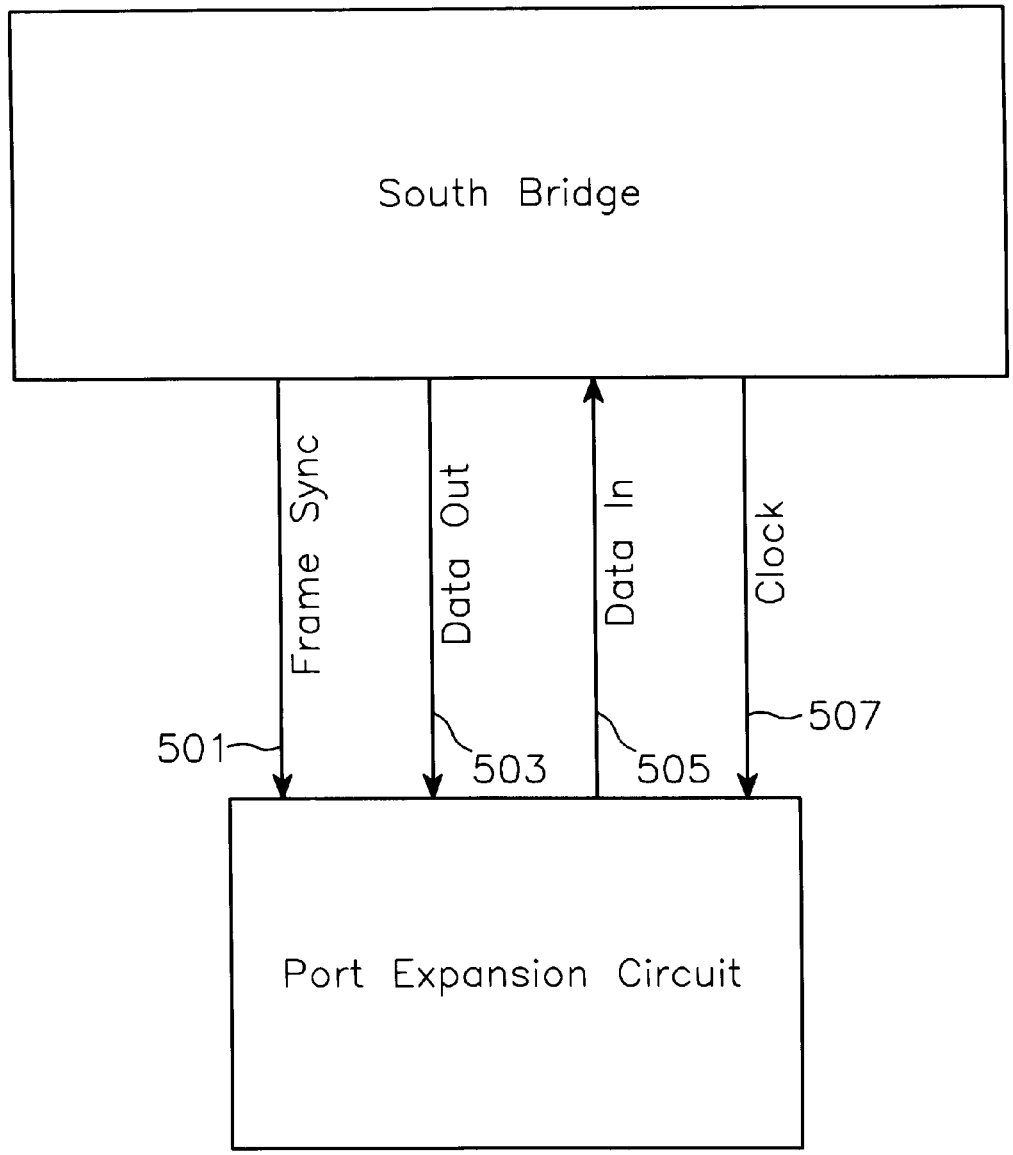
FIG. 5 shows a four line embodiment of the bus connecting the South Bridge and the port expansion circuit of the personal computer of FIG. 2.

Referring now to FIG. 5, the first embodiment of the bus includes a frame sync 501, a synchronous data clock 507, a Data In line 505 (data from the port expansion circuit to the South Bridge), and a Data Out line 507 (from the South Bridge to the port expansion circuit). In one exemplary embodiment, the nominal clock rate is 50 MHz and a frame is chosen to contain 96 bits. Other frame lengths and clock rates are of course possible. For example, in another embodiment, the clock rate is 33 MHz and data is clocked on both rising and falling edges of the clock signal.

Figure 6:
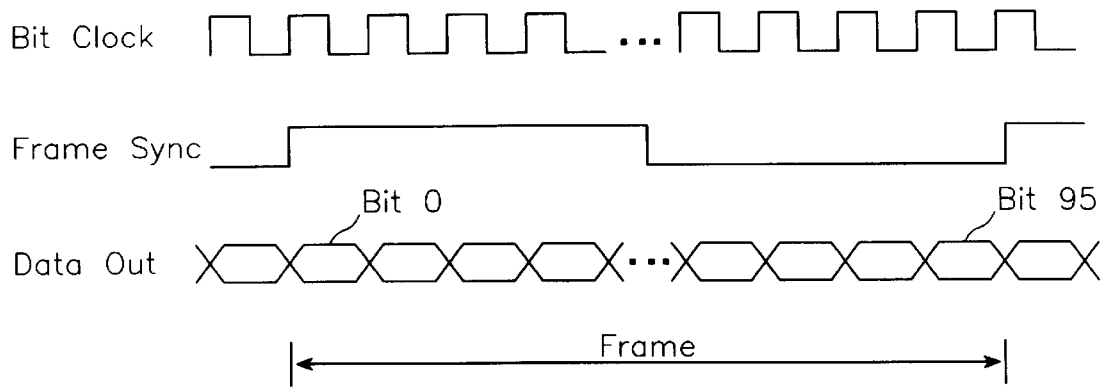
FIG. 6 is a timing diagram for the port expansion bus (PEB).
Figure 7:
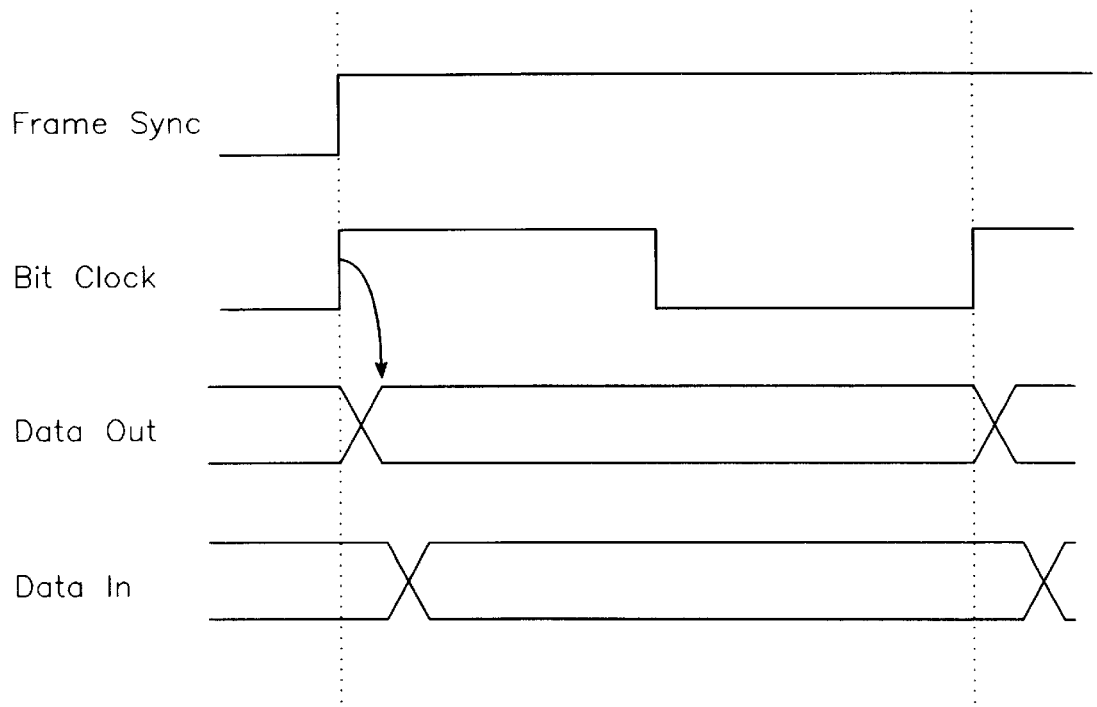
FIG. 7 is a timing diagram showing the relation between the frame sync signal, the bit clock, Data In and Data Out on the port expansion bus.

Referring to FIG. 6, the beginning of each frame is determined by assertion of the frame sync signal. The frame sync signal is preferably a 50% duty cycle signal to facilitate counting frame bits. Other duty cycles are of course possible. One frame consists of 96 clock periods. Referring to FIG. 7, one data bit is provided on the Data Out and Data In line each clock period during each frame. The data bits are provided relative to the rising edge of the bit clock in the embodiment shown. With a frame of 96 bits, the frame rate is nominally 500 kHz. Each bit in each frame that represents an I/O bit is sampled and provided from/to the appropriate I/O pin of the port expansion circuit approximately every 2 microseconds. That speed is sufficiently high to support most of the legacy devices supported by the port expansion circuit.

In order to help ensure that the interfaces to the legacy devices operate correctly, i.e., that the I/O signals are adequately reflected, in a preferred embodiment, the bus is "protocol free," in that there are no activation sequences or complex state machines required. The bus is simply a 96-bit time-slot structure where each bit time is assigned a specific function. FIGS. 8a and 8b show the non-parallel port bit time slot assignments to and from the port expansion circuit. All bits in FIGS. 8a and 8b are numbered with respect to the leading edge of frame sync. In addition to being "protocol free", the bus operates to continuously transfer frames between the port expansion circuit and the South Bridge. The frames are contiguous in that there is no time between each frame, i.e., the start of bit 0 is one clock period from the start of bit 95. However, other embodiments may provide some time periods between frames so long as the port expansion bus stays substantially continuously running to sufficiently satisfy the speed requirements of the pin reflection approach described herein. The I/O pin values are transferred every 2 microseconds whether they change or not. However, the bus does not operate while the port expansion circuit and South Bridge are in a power down mode to reduce power consumption.

Referring again to FIGS. 8a and 8b, the frame includes provision (Link Command/Status) for transmitting commands to the port expansion circuit and receiving back status from the port expansion circuit. Commands are transmitted from the South Bridge to the port expansion circuit via the first nine bits of the frame. Bit 0 is a flag that, when set, indicates that the command field is valid and therefore a new command is being transmitted. Bits (1:8) contain the command byte; thus, there are 256 possible commands. The individual commands can be, for example, requests for the port expansion circuit to take some action (such as entering a power management state) or a request to read a register within the port expansion circuit.

Figure 9A:
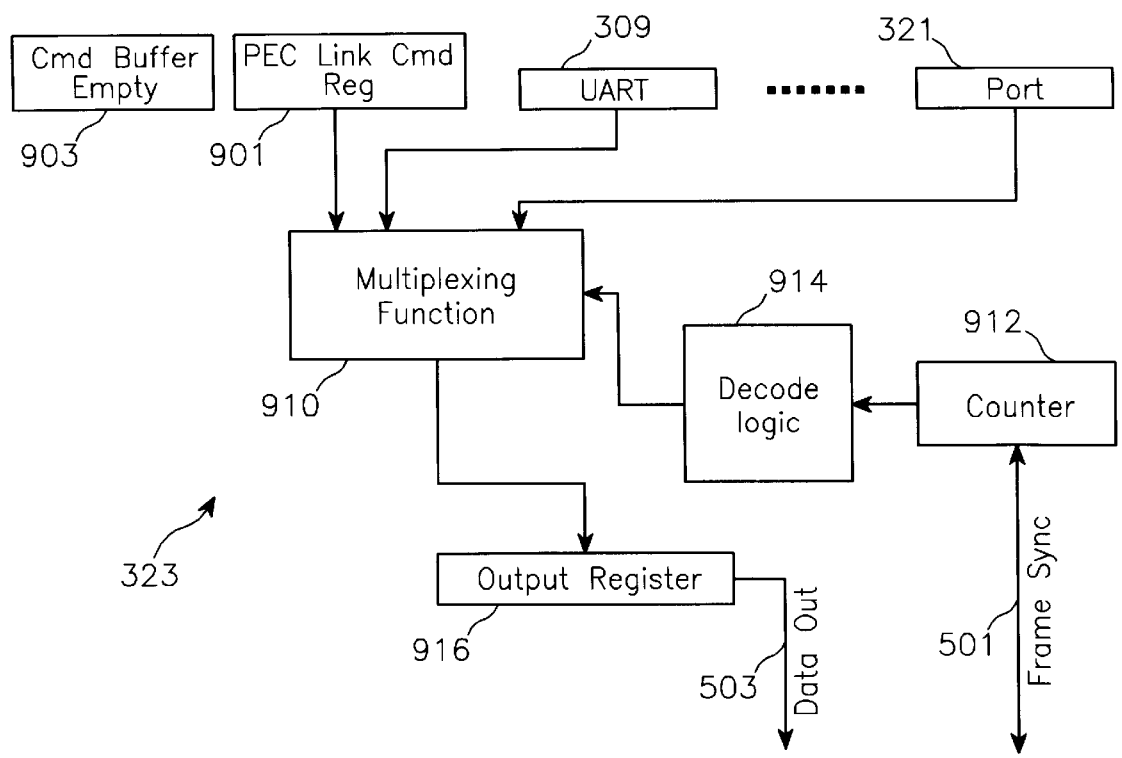
FIG. 9*a* is a schematic block diagram of the port expansion bus host interface in the South Bridge.

Commands are sent only once. That is, the Valid bit (bit 0) is only active for a single frame. Commands are transmitted during the next frame following a CPU write to the port expansion circuit Link Command Register 901 which is located in the host interface in the South Bridge as shown in FIG. 9a. There is no provision for buffering up commands. A Command Buffer Empty status bit 903 is provided in the South Bridge indicating that a new command can be sent.

When the Valid bit (bit 0) is inactive, the link command bits 0–7 may be used to transfer other information such as static command information. Such static command information may include a "keep alive" field which informs the port expansion circuit that the South Bridge is still present.

In the receive frame received from the port expansion circuit, the bits corresponding to the link command bits in the transmit frame are link status bits (bits 1:8). The status field has two modes. First, the status field presents static status information, i.e., the eight bits reflect the current status of the port expansion circuit. The static status field my include such information as the mode of the parallel port, the mode in which other ports are operating, the power mode of the port expansion circuit and any diagnostic information available. Secondly, the status field can be used to return read data requested by a specific command sent from the South Bridge, i.e., a command sent from the South Bridge in the Link Command field requesting that specific data, such as a the contents of a register, be returned. The Response/Status bit (bit 0) indicates in which mode the link status field is operating during that frame.

Figure 9B:
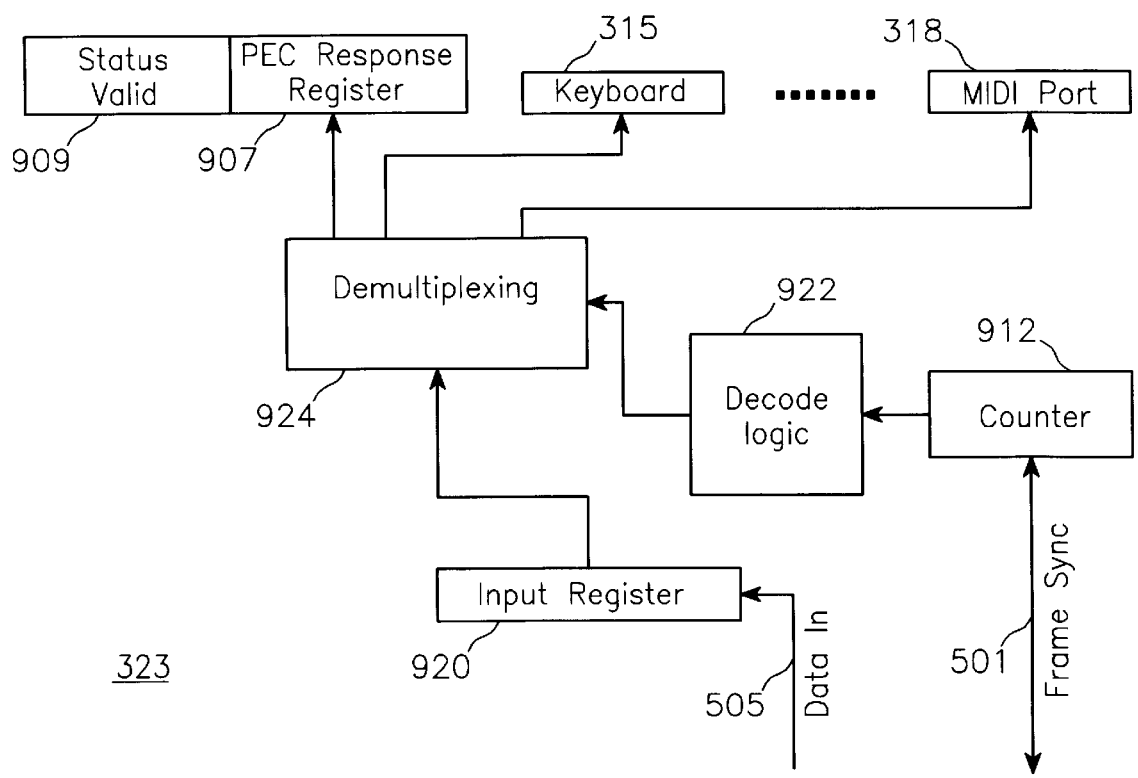
FIG. 9*b* is a schematic block diagram of the receive logic of the port expansion bus host interface in the South Bridge.

When the Response/Status bit is active, the data field (bits 1:8) contains the response to a request received in the immediately preceding frame. Responses are only sent for a single frame time. Referring to FIG. 9b, there is only a single byte buffer 907 (the port expansion circuit Response Register) for received responses located in the South Bridge. User software should not transmit additional response requests until it has read the data from the port expansion circuit Response Register. A status valid bit 909 is provided indicating the availability of valid data in the port expansion circuit Response Register for the CPU. The bit is cleared when the port expansion circuit Response Register is read. Static status information is transmitted during all frames where the Response/Status bit is non asserted.

With the exception of the link command/status field, printer port data fields, game port X and Y comparators, and reserved bits, all bit positions in the frame are "reflected pins." In essence, the state of a signal on the transmitting side of the link is reflected to a signal on the other side. The state of each bit is updated each frame time (nominally every 2 microseconds). In this way, the states of relatively slow changing signals can be transmitted over a time-division serial bus and recreated on the other side. The state of input pins on the port expansion circuit are sent to the South Bridge via the Data In pin. The state of output pins on the port expansion circuit are sent from the South Bridge via the Data Out pin.

Referring again to FIGS. 9a and 9b, the port expansion bus host interface 323 in the South Bridge is shown in greater detail. The various bits located at the outputs of the logic interface blocks 309–321 are provided to multiplexing logic block 910. The correct bit is selected for output onto Data Out line 503 at the right time slot based on the value in the counter 912. A decode of the counter value is used in decode logic 914 to select the appropriate bit to output at the particular time slot. In one embodiment, output register 916 may be implemented as a serial shift register, that is loaded up every 8 clocks with new data to be shifted out.

FIG. 9b shows additional details on the receive side of the host interface 323. Data In is received on the Data In line 505 from the port expansion circuit and placed in the input register 920. In some implementations, register 920 may be a single bit and in other implementations, it may be a serial shift register which buffers, e.g., a byte of date before the data is provided to the appropriate logic interfaces. The decode logic 922 which directs the input data through logic 924 to the appropriate ports, e.g. ports 315–318, may have significant overlap with decode logic 914 shown in FIG. 9a. When a bit is received, it is transmitted to the appropriate interface and clocked into the input port of that interface. That function may be accomplished by enabling a clock to that input latch when the time slot for that bit has been received.

Figure 10:
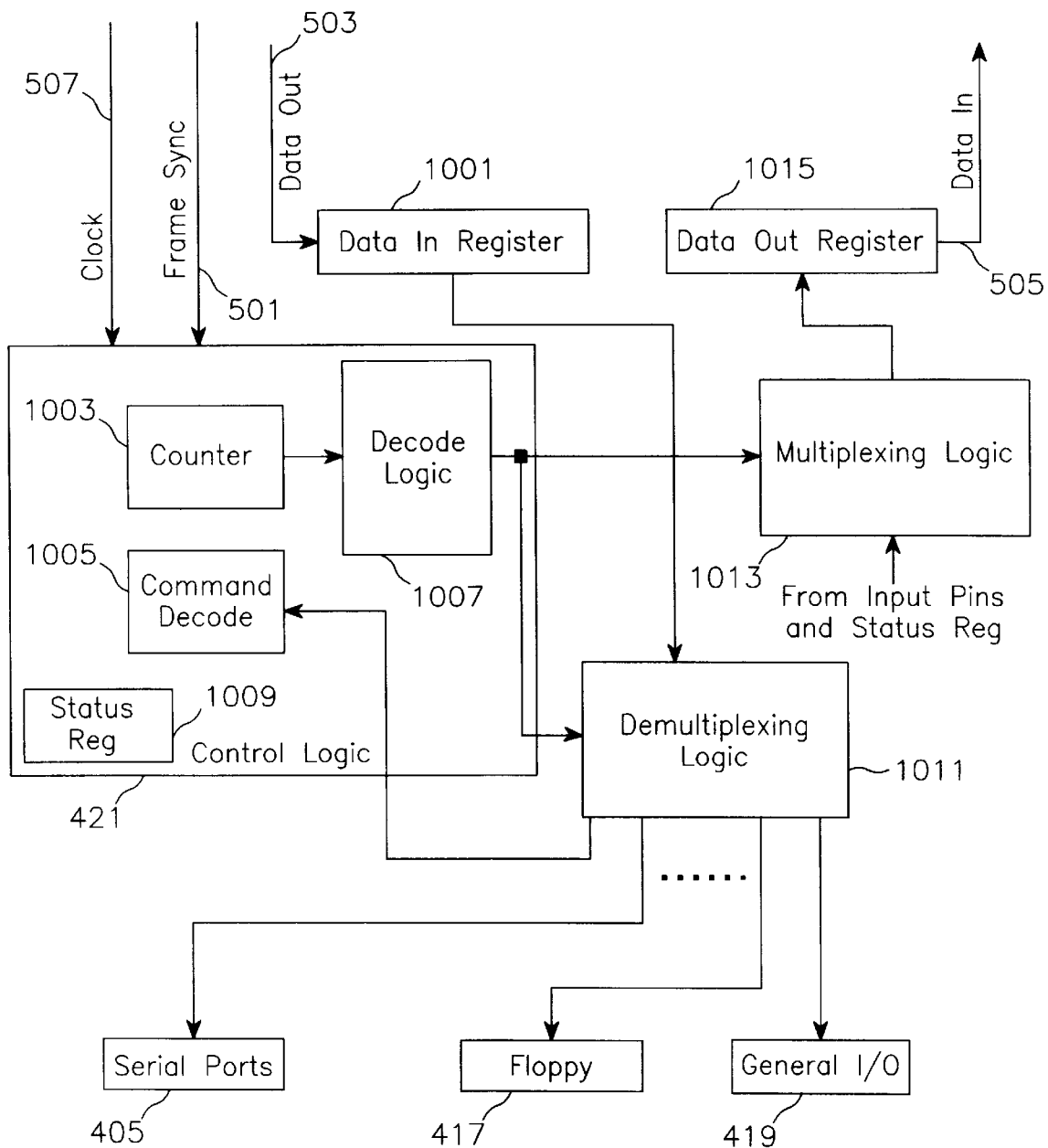
FIG. 10 is a schematic block diagram showing further details of the port expansion circuit.

FIG. 10 shows additional details of the port expansion circuit. Data is received on Data Out line 503 from the South Bridge. It is received into a data register 1001 and sent to the appropriate I/O port 405 through 419 based on the counter value in counter 1003 and decode logic 1007 and logic 1011. Logic 1011 may provide a clock to the appropriate output port at the appropriate bit time. The control logic 421 includes the command decode logic 1005 to decode commands sent from the South Bridge as well as status register 1009. Data bits received from the I/O ports are assigned to their correct bit times in each frame by multiplexing logic 1013 and provided to the data out register 1015 at the appropriate bit time.

An example of pin reflection according to the invention is as follows. The PC Speaker is connected to the counter-timer block 312 in the South Bridge and the frequency of the speaker is determined by the frequency of the digital signal output by the counter timer block 312 which is an 8253 or 8254-2 equivalent timer/counter. At the start of bit time 82 of each frame, the state of the counter timer's PC Speaker output is sampled. Bit position 82 in the frame transmitted to the port expansion circuit is updated to reflect the sampled state. At the port expansion circuit end, the state of the Data Out pin is latched during bit time 82. The PC Speaker pin on the port expansion circuit always reflects the latched value. Thus, the PC Speaker pin always reflects the state of the counter timer output, with a delay of up to 2 microseconds.

Functions within a personal computer system that utilize pin reflection include and can be supported by the 4 pin bus described herein include the PC Speaker, MIDI Port, Keyboard, Mouse, Serial Ports and General I/O. The Parallel Port and the Game Port and the Floppy port may not use pin reflection for all functions.

The transmit frame shown in FIG. 8a includes bits 32:42 for the floppy disk drive. Serial port 0 and serial port 1 are provided in bits 48:50 and 53:55, respectively. Bits 54 to 57 may also be used for an infrared port such as the Infrared Data Association (IrDA) port. Bits 65:68 are utilized for the game port. Bit 82 provides the PC speaker out. Bit 83 is a MIDI transmit (TX) bit. Bits 84–95 are user defined bits. The remaining bits are reserved for future use.

The receive frame is shown in FIG. 8b includes bits 32:35 as inputs from the floppy drive. Bits 48:57 are serial port 0 and serial port 1 bits. Bits 54:57 may be utilized for an IrDA port or a mouse as indicated. Bits 65:72 are utilized for the game port inputs. Bit 83 is a MIDI receive (RX) bit. As shown bits 84–95 are examples of what might constitute general I/O bits. For example, bit 84, Vol+, bit 85 Vol− and bit 86, mute, could be used to control speakers that are resident in a terminal. Bit 87 can be used as a key lock indicator indicating the status of the lock on the front of the computer. The turbo bit can indicate if the PC is in turbo mode. Setup disable can indicate the user of the PC is prevented from going into a setup mode. CLR CMOS is used to clear battery backup memory containing basic system configuration such as what drives are installed and how much memory is available. Bits 91–94 could be used to indicate the status of dip switches on the board. Bit 95 is a general I/O bit. The remaining bits in the frame are reserved for future use.

Another function that is advantageously integrated into the port expansion circuit IC is the clock synthesis function. The port expansion circuit is in a process that is well suited for this type of quasi-analog function. Also, greater control over power management is offered by putting the clock synthesis function in the chipset. Furthermore, the port expansion circuit is pad-limited (meaning that the minimum size of the IC, as determined by the number of pins located around the outside edge of a square, is larger than the area necessary to contain the chip's logic). Thus, adding the function produces little marginal cost increase and integration reduces motherboard chip count, board space, and cost.

Referring again to FIG. 4, port expansion circuit 205 includes clock synthesizer 423 and legacy device ports 405–419. Clock synthesizer 423 provides several clocks to computer system 200 via I/O terminals 1124. The number of I/O terminals 1124 is determined at least in part by the number of clocks provided by clock synthesizer 423 to computer system 200. Clock synthesizer 423 typically provides processor clocks to the processor 110, bus clocks to PCI bus 125, reference clocks, a keyboard clock and a floppy disk clock. Legacy device ports 405–419 include serial port 405, PC speaker port 407, parallel port 409, keyboard and mouse ports 411, game port 413, MIDI port 415, floppy port 417, IR port 425 and general I/O 419.

PC motherboards require a number of clock signals. These are normally produced from a single crystal using a clock synthesizer IC. Clock synthesizer 423 provides the multiple clocks which are required by the PC system. Typically, clock synthesizer 423 is pin programmable to allow on board selection of clocking modes. For example, certain inputs to clock synthesizer 423 allow selection of processor and bus clock speeds and test clock mode. An exemplary clock synthesizer 423 is the CY2254A clock synthesizer/driver manufactured by Cypress Semiconductor Corporation of San Jose, Calif. The CY2254A clock synthesizer/driver is described in the CY2254A clock synthesizer/driver data sheet (revised February 1996) which is incorporated herein by reference. Another exemplary clock synthesizer is the CGS701AV PLL clock driver manufactured by National Semiconductor Corporation of Santa Clara, Calif. Such clock synthesizers are well known in the art. Of course, other types of clock synthesizers may be substituted in different embodiments of computer system 200, the specific clocks provided being dependent upon the requirements of the computer system 200. Indeed, it is anticipated that other types of clock synthesizers will be incorporated in next generation embodiments of computer system 200 as new buses and processors are developed.

Figure 11:
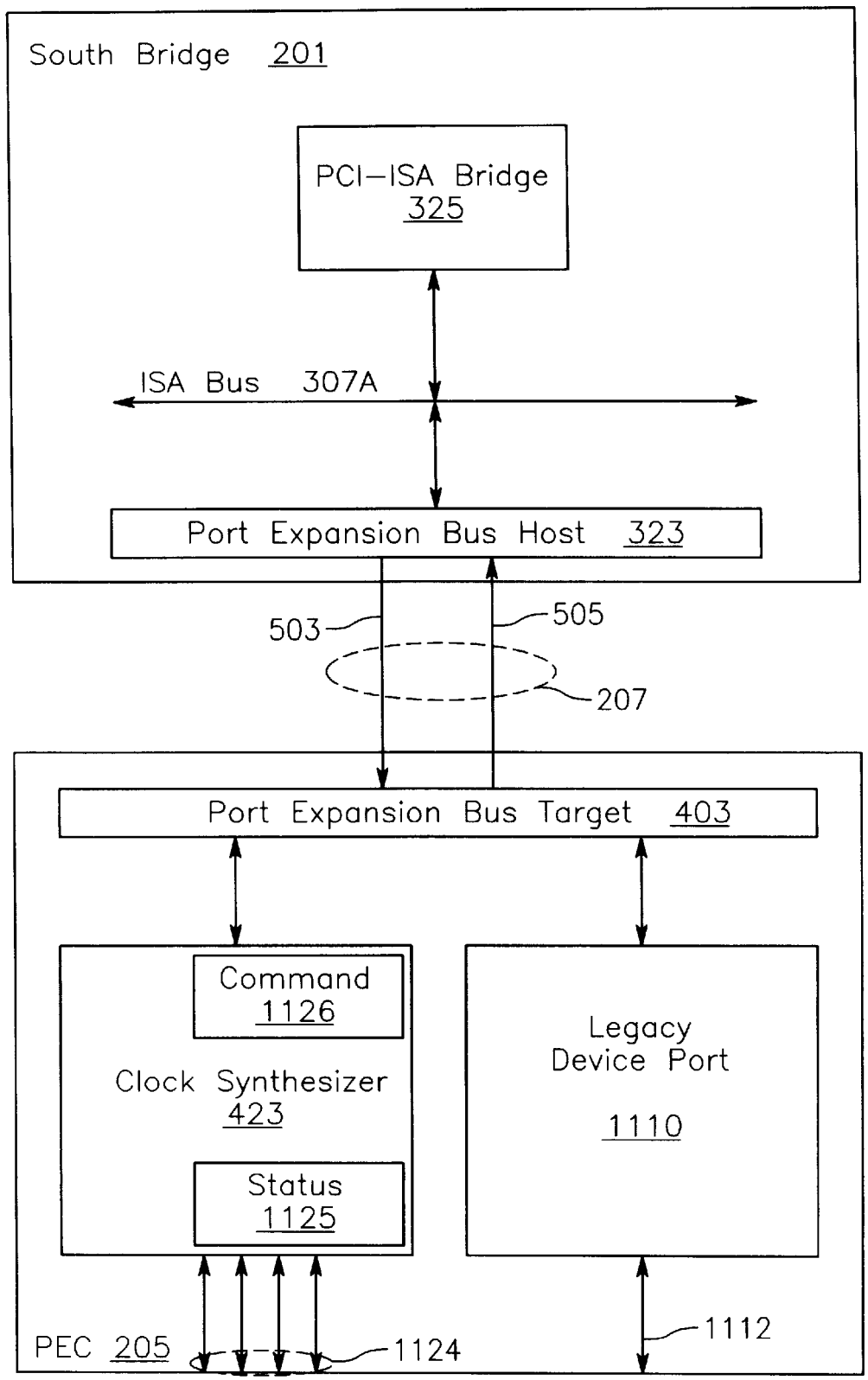
FIG. 11 is a schematic block diagram showing further details of the port expansion circuit.

Referring to FIG. 11, port expansion circuit 205 includes clock synthesizer 423 and legacy device port 1110. Legacy device port 1110 includes one of the legacy device ports 405–419. Legacy device port 1110 interfaces with a corresponding legacy device via I/O terminals 1112. Clock synthesizer 423 and legacy device 1110 interface with the South Bridge via port expansion bus 207. Clock synthesizer 423 provides clocks to computer system 200 via I/O terminals 1124. The number of I/O terminals 1124 may vary according to the number of clocks provided by clock synthesizer 423. In one embodiment, clock synthesizer 423 provides processor clock outputs for processor 110, bus clock outputs for PCI bus 125, reference/test clock outputs, and keyboard and floppy clock outputs, all via I/O terminals 1124.

In operation, clock synthesizer 423 may be controlled via messages sent over the command channel (i.e., in the link command field) of data out line 503 of port expansion bus 207. Exemplary control messages include a message to divide a particular clock by an amount (e.g., divide by 2) and a message to stop a particular clock. The start-up state of clock synthesizer 423 is selected via option selection pins. In one embodiment, two selection inputs to clock synthesizer allow selection of the processor clock frequency and bus clock frequency from a number of available clock frequencies. The processor and bus speeds selection inputs are typically hardware predetermined and are settable by jumpers on a system board. The state of the clock synthesizer 423 is selectable via an output enable input to clock synthesizer 423 which enables or tristates the outputs of clock synthesizer 423. In one embodiment, at least one selection input allows selection between normal clock mode(s) and test clock mode(s). The selection between normal & test clock modes can be controlled, e.g., by control messages sent over the command channel of data out line 503 of port expansion bus 207.

Clock synthesizer 423 may include a status register 1125 and a command register 1126. Status register 1125 stores clock synthesizer status information that is provided to the South Bridge via the response channel of data in line 505 of port expansion bus 207. For example, an operation status bit or active bit provides information to the South Bridge indicating that the clock synthesizer 423 is powered-up and fully operational. Other status bits may provide information to computer system 200 regarding the current state of the pin programming of the pin programmable clock synthesizer 423 integrated circuit. Those status bits that are provided are sent back to the South Bridge via bits provided in each frame. For example, any of reserved bits 9–31 may be designated as clock synthesizer status bits. Alternatively, the status bits may be retrieved via a read register command in the Link Command/Status field described previously.

The description of the invention set forth herein is illustrative of an embodiment of the invention, and is not intended to limit the scope of the invention as set forth in the following claims. For instance, those skilled in the art will recognize that boundaries between logic blocks are merely illustrative and that alternative embodiments may merge logic blocks or impose an alternate decomposition of functionality.

Furthermore, the invention has been described with the expansion bus being the ISA bus. In other embodiments, the expansion bus may be different. For instance, as PC architecture continues to evolve, the PCI bus may become the input/output bus that is presently the ISA bus in the embodiment described above and the legacy devices may be those that interface to the PCI bus today. In such an embodiment, the South Bridge would provide an interface between PCI legacy devices and the PCI bus. Other buses may also serve as the input/output or expansion bus such as the MCA bus.

Variations and modifications of the embodiments disclosed herein may be made based on the description set forth herein, without departing from the scope and spirit of the invention as set forth in the following claims.

What is claimed is:

1. An apparatus for processing information, the apparatus comprising:
   a first integrated circuit including functional logic;
   a second integrated circuit including a clock synthesizer circuit, the clock synthesizer circuit providing clocks for the apparatus, the second integrated circuit including I/O terminals for the clock synthesizer circuit and for the functional logic; and
   a bus coupling the first and second integrated circuits, the bus providing for serial transfer of information between the first and second integrated circuits, the information including output signals from the functional logic provided to the I/O terminals, and input signals for the functional logic from the I/O terminals, the information further including clock synthesizer information, wherein the clock synthesizer information includes at least one of status information and command information.

2. The apparatus of claim 1, wherein the clock synthesizer circuit includes at least one status bit, the status bit being coupled to the bus to provide the status information to the first integrated circuit.

3. The apparatus of claim 2, wherein the status information indicates pin programming of the clock synthesizer circuit.

4. The apparatus of claim 1, wherein the clock synthesizer information includes the command information, the command information being transferred from the first integrated circuit to the clock synthesizer circuit.

5. The apparatus of claim 4, wherein the command information includes a command to change a frequency of at least one of the clocks provided by the clock synthesizer circuit.

6. The apparatus of claim 4, wherein the command information includes a command to stop at least one of the clocks provided by the clock synthesizer circuit.

7. The apparatus of claim 4, wherein the command information includes a command to select a clock mode from at least two clock modes of the clock synthesizer circuit, the at least two clock modes including a normal clock mode and a test clock mode.

8. The apparatus of claim 4, wherein the clock synthesizer circuit includes at least one status bit, the status bit coupled to the bus to provide clock synthesizer status information to the first integrated circuit responsive to receiving command information requesting a read of the status bit.

9. The apparatus of claim 1, wherein the I/O terminals include I/O terminals to interface to at least one legacy device, the at least one legacy device including one of a serial port and a keyboard and a mouse and a game port and a musical instrument digital interface (MIDI) port and a floppy drive and a PC speaker.

10. The apparatus of claim 1, wherein at least a first substantial portion of circuitry on the first integrated circuit operates at a lower voltage than at least a second substantial portion of circuitry on the second integrated circuit.

11. The apparatus of claim 10, wherein the first substantial portion of first integrated circuit operates at less than or equal to 3.5 volts and the second substantial portion of the second integrated circuit operates substantially at 5 volts.

12. The apparatus of claim 10, wherein the second substantial portion of the second integrated circuit operates substantially at 5 volts.

13. The apparatus of claim 1, wherein the first integrated circuit is comprised of a majority of transistors whose channel lengths are at least as small as a first value and wherein the second integrated circuit is comprised of transistors all of whose channel lengths are longer than the first value.

14. The apparatus of claim 13 wherein the first value is 0.5 microns.

15. The apparatus of claim 1 wherein all the transistors of the second integrated circuit have channel lengths that are at least as great as 0.5 microns and at least some of the transistors of the first integrated circuit are smaller than 0.5 microns.

16. The apparatus of claim 1 wherein the apparatus is a computer system, the apparatus further including a processor coupled to the first integrated circuit, the clock synthesizer providing clocks for the processor.

17. A method of providing an integrated clock synthesizer, the method comprising:
providing functional logic on a first integrated circuit;
providing a clock synthesizer circuit on a second integrated circuit;
providing I/O terminals on the second integrated circuit for the clock synthesizer circuit and the functional logic; and
serially transferring information on a bus between the first and second integrated circuits, the information including output signals from the first integrated circuit provided to the I/O terminals, and input signals for the functional logic from the I/O terminals, the information further including clock synthesizer information, the clock synthesizer information including at least one of status information and command information.

18. The method of claim 17, wherein the bus transfers the status information from the clock synthesizer circuit to the first integrated circuit.

19. The method of claim 17, wherein the bus transfers the status information from the clock synthesizer circuit to the first integrated circuit, the status information including pin programming information.

20. The method of claim 17, wherein the bus transfers the command information from the first integrated circuit to the clock synthesizer circuit.

21. The method of claim 17 wherein the functional logic comprises at least one legacy device port, the at least one legacy device including one of a serial port and a keyboard port and a mouse port and a game port and a musical instrument digital interface (MIDI) port and a floppy drive port and a PC speaker port.

22. The method of claim 17, further comprising operating at least a first substantial portion of circuitry on the first integrated circuit at a lower voltage than at least a second substantial portion of circuitry on the second integrated circuit.

23. The method of claim 17, wherein the first integrated circuit is comprised of a majority of transistors whose channel lengths are at least as small as a first value and wherein the second integrated circuit is comprised of transistors all of whose channel lengths are longer than the first value.

24. The method of claim 17 wherein all the transistors of the second integrated circuit have channel lengths that are at least as great as 0.5 microns and at least some of the transistors of the first integrated circuit are smaller than 0.5 microns.

25. A first integrated circuit comprising:
a clock synthesizer circuit:
at least one legacy device port, the at least one legacy device port including at least one of a serial port and a keyboard port and a mouse port and a game port and a musical instrument digital interface (MIDI) port and a floppy drive port and a PC speaker port:
clock I/O terminals for the clock synthesizer circuit, the clock I/O terminals providing clock outputs and control inputs;
port I/O terminals. the port I/O terminals for interfacing to at least one legacy device corresponding to the legacy device port; and
wherein the first integrated circuit is coupled to a bus, the bus serially transferring information between the first integrated circuit and functional logic on a second integrated circuit responsive to being powered on, the information including output signals from the functional logic provided to the I/O terminals and input signals for the functional logic from the I/O terminals.

26. The first integrated circuit of claim 25, wherein the second integrated circuit is coupled to a processor in a computer system, the processor receiving at least one clock from the clock synthesizer circuit via at least one of the clock I/O terminals, the processor providing output information to the at least one legacy device port and receiving input information from the at least one legacy device port.

27. The first integrated circuit of claim 25, wherein the clock synthesizer circuit is coupled to receive control messages via the bus, the clock synthesizer circuit being programmably controlled by the control messages responsive to receiving the control messages.

28. The first integrated circuit of claim 25, wherein the clock synthesizer circuit includes at least one status bit providing clock synthesizer status information, the status bit being selectively coupled to the bus.

* * * * *